(12) United States Patent
Delbaere et al.

(10) Patent No.: US 9,316,482 B2
(45) Date of Patent: Apr. 19, 2016

(54) MAGNETIC MULTI-TURN ABSOLUTE POSITION DETECTION DEVICE

(75) Inventors: Michaël Delbaere, Avanne-Aveney (FR); Gérald Masson, Besançon (FR); Yannick Ronnat, Vorges les Pins (FR); Stéphane Biwersi, Frambouhans (FR)

(73) Assignee: MOVING MAGNET TECHNOLOGIES (MMT), Besançon (FR)

( * ) Notice: Subject to any disclaimer, the term of this patent is extended or adjusted under 35 U.S.C. 154(b) by 188 days.

(21) Appl. No.: 13/817,686

(22) PCT Filed: Aug. 12, 2011

(86) PCT No.: PCT/FR2011/051912
§ 371 (c)(1),
(2), (4) Date: Mar. 20, 2013

(87) PCT Pub. No.: WO2012/025683
PCT Pub. Date: Mar. 1, 2012

(65) Prior Publication Data
US 2013/0169270 A1    Jul. 4, 2013

(30) Foreign Application Priority Data

Aug. 24, 2010    (FR) .................................... 10 56726

(51) Int. Cl.
*G01B 7/30*        (2006.01)
*G01D 5/245*        (2006.01)
(Continued)

(52) U.S. Cl.
CPC ............... *G01B 7/30* (2013.01); *G01D 5/2458* (2013.01); *G01D 5/24409* (2013.01); *G01L 3/104* (2013.01)

(58) Field of Classification Search
CPC ... G01D 5/24409; G01D 5/2458; G01B 7/30; G01L 3/104
USPC ............... 324/207.05, 207.21, 207.24, 207.2, 324/207.11, 77, 76, 76.11, 76.39, 143, 361, 324/340, 116, 160
See application file for complete search history.

(56) References Cited

U.S. PATENT DOCUMENTS

| 5,444,313 A | 8/1995 | Oudet |
| 5,532,585 A | 7/1996 | Oudet et al. |

(Continued)

FOREIGN PATENT DOCUMENTS

| FR | 2919385 A1 * | 1/2009 |
| WO | WO-2005076860 A2 | 8/2005 |

(Continued)

OTHER PUBLICATIONS (Machine Translated of Miyashita et al WO 2008136054 A1) Miyashita et al, Magnetic encoder and absolute rotational postional detection method. Nov. 2008.*

(Continued)

*Primary Examiner* — Melissa Koval
*Assistant Examiner* — Felicia Farrow
(74) *Attorney, Agent, or Firm* — Harness, Dickey & Pierce, P.L.C.

(57) ABSTRACT

The disclosure relates to a magnetic device for detecting the absolute position of an input shaft capable of rotating more than 360°, the device including a main magnetic sensor, a motion reducer, and a secondary magnetic sensor, wherein the main magnetic sensor is connected to a rotor, measures the rotation of the shaft for ranges of angles of less than 360°, and includes a main magnet, the motion reducer converts the rotation of the shaft into a reduced rotation, the maximum amplitude of which is equal to no more than 360°, and the secondary magnetic sensor measures the reduced rotation and includes a secondary magnet. According to the disclosure, the secondary magnet is arranged between the upper and lower planes of the main rotor, and the main magnet has P pairs of poles, where P is greater than 1.

21 Claims, 9 Drawing Sheets

(51) Int. Cl.
*G01D 5/244* (2006.01)
*G01L 3/10* (2006.01)

(56) References Cited

U.S. PATENT DOCUMENTS

| | | | |
|---|---|---|---|
| 5,814,985 A | 9/1998 | Oudet | |
| 5,982,171 A * | 11/1999 | Umemoto | G01D 5/147 |
| | | | 123/406.58 |
| 6,087,827 A | 7/2000 | Oudet | |
| 6,518,749 B1 | 2/2003 | Oudet et al. | |
| 6,573,709 B1 | 6/2003 | Gandel et al. | |
| 6,593,734 B1 | 7/2003 | Gandel et al. | |
| 7,028,545 B2 * | 4/2006 | Gandel et al. | 73/328 |
| 7,268,538 B2 * | 9/2007 | Johnson | G01D 5/145 |
| | | | 324/207.2 |
| 7,391,205 B2 | 6/2008 | Gandel et al. | |
| 7,583,808 B2 | 9/2009 | Smaragdis et al. | |
| 7,589,445 B2 | 9/2009 | Gandel et al. | |
| 7,644,635 B2 | 1/2010 | Prudham et al. | |
| 7,784,365 B2 | 8/2010 | Masson et al. | |
| 7,898,122 B2 | 3/2011 | Andrieux et al. | |
| 7,906,959 B2 | 3/2011 | Frachon et al. | |
| 8,072,209 B2 | 12/2011 | Jerance et al. | |
| 8,278,914 B2 | 10/2012 | Tanaka et al. | |
| 8,373,410 B2 | 2/2013 | Frachon | |
| 2004/0061495 A1 * | 4/2004 | Shimomura | G01D 5/145 |
| | | | 324/207.25 |
| 2008/0272723 A1 * | 11/2008 | Rudel et al. | 318/400.39 |
| 2010/0026282 A1 * | 2/2010 | Kaita et al. | 324/207.25 |
| 2010/0163333 A1 * | 7/2010 | Patil | B62D 15/0215 |
| | | | 180/402 |
| 2010/0194385 A1 * | 8/2010 | Ronnat et al. | 324/207.25 |
| 2011/0121824 A1 * | 5/2011 | Sterling | G01D 5/145 |
| | | | 324/207.22 |
| 2011/0254543 A1 | 10/2011 | Frachon et al. | |
| 2011/0267040 A1 | 11/2011 | Frachon | |
| 2012/0109463 A1 * | 5/2012 | Elkins | A01B 69/008 |
| | | | 701/42 |
| 2012/0146627 A1 | 6/2012 | Masson et al. | |
| 2012/0262162 A1 | 10/2012 | Masson et al. | |

FOREIGN PATENT DOCUMENTS

| | | |
|---|---|---|
| WO | WO 2008136054 A1 * | 11/2008 |
| WO | WO-2009047401 A2 | 4/2009 |
| WO | WO-2009101270 A2 | 8/2009 |
| WO | WO-2010046550 A1 | 4/2010 |

OTHER PUBLICATIONS

English translation of the International Preliminary Report on Patentability, IB/Geneva, issued Feb. 26, 2013, incorporating the English translation of the Written Opinion of the ISA, ISA/EP, mailed Oct. 14, 2011.

* cited by examiner

MAGNETIC MULTI-TURN ABSOLUTE POSITION DETECTION DEVICE

CROSS-REFERENCE TO RELATED APPLICATIONS

This application is National Phase Entry of International Application Serial No. PCT/FR2011/051912, filed on Aug. 12, 2011, which claims priority to French patent application Ser. No. 10/56726, filed on Aug. 24, 2010, both of which are incorporated by reference herein.

BACKGROUND AND SUMMARY

The present invention relates to the field of magnetic position sensors and more precisely a magnetic detection device intended to measure precisely (i.e. typically with a precision to less than 1 degree) the absolute position of an input shaft rotating over several turns, such as for example a steering column the position of which must be detected over an angle that may range up to approximately 1080° (+/−3 turns). The invention also relates to a magnetic multi-turn absolute position detection device for detecting a torque in a compact configuration.

The applicant's patent application WO 2009/047401 is known, which presents the use of two position sensors, one for the position of the input shaft by means of a so-called "fine" sensor and the other for the multi-turn information via information referred to as "rough" since it is dependent on the motion conversion. One of the advantages of this sensor is that the two items of information are absolute. Thus, even in the event of damage to the input sensor, absolute information, certainly rough, is maintained. In the search for a sensor for an application with a high level of safety this represents a clear advantage in terms of robustness with respect to the prior art. Nevertheless, the position information issuing from the diametrally magnetised input sensor is not always sufficiently precise for a critical application such as that of a steering column since, over 360° of detection angle, it is not possible to achieve precision of very much less than +/−1° with a contactless sensor, compatible with manufacturing constraints and robustness of large-volume applications.

The patent application EP 1 830 155 A1 provides a response to this precision issue by claiming the use of a sensor connected to the input shaft, referred to as the "main sensor", and implemented by means of a multiple magnet referred to as the "main magnet" in association with an absolute sensor that will be called the "secondary sensor" or "turn sensor" giving a rough multi-turn position via a motion conversion. The whole sets out to constitute a precise sensor. Nevertheless, the solutions as described in this application suffer from both an excessive space requirement and the fact that it is impossible to meet all the specifications in terms of precision of the applications concerned. They are in addition solely illustrated with the use of 2 magnetoresistive sensors of the AMR type for the two magnetosensitive sensors, which restricts the possibilities.

This solution is in fact bulky, as attested to by the figures illustrating the configurations proposed. This is because, in two of the three cases presented the motion conversion and the secondary sensor are dissociated from the main magnet, leading to the use of two distinct printed circuits and therefore to an additional cost and an increase in the size of the structure. Thus this solution cannot be easily integrated in other mecatronic devices (motor, sensor, etc.) for reasons of excessive space requirement. The third configuration proposes the integration of one of the gears of the gear train directly on the main rotor, but then again the axial space requirement is not optimised since the shaft of the secondary rotor is orthogonal to that of the main rotor.

Moreover, the invention specifically prescribes the use of magnetoresistive sensors. Now, though they are well suited to magnet configurations referred to as "shaft end", as is the case with the secondary sensor when the probe is positioned on the magnet rotation shaft, their use for configurations outside the axis of revolution of a magnet, such as integrated in the main rotor, has the drawback of constituting a solution having substantial dimensional limits, as will be explained below. This is because the normal, tangential and axial components generated by a multipole magnet are generally not of equal magnitudes and have variations that are not perfectly sinusoidal. Since the variation in magnetic angle is not linear as a function of the displacement, the result is an angular error, since the magnetoresistive elements (of the AMR type) as described generate, via a physical variation in their resistance, an output signal directly proportional to the rotation of the magnetic field in a plane with a periodicity of 180°.

These defects in the signals have several origins: lack of sensitivity of the sensors, lack of magnetisation, distortions caused by the proximity of the sensor to the surface of the magnet, distortions caused by the proximity of a secondary magnet as is the case in the solution or quite simply edge effects that a ring has since it is not infinitely long. This therefore requires the use of artifices (algorithms, memories, etc.) described in the application EP 1 830 155 and intended to measure the offsets of the two components or to correct these errors by computer. The latter require a computing capacity that must be allocated in the processing electronics, which is detrimental. Thus the sensor configuration as described in the patent application EP 1 830 155 is clearly suited to configurations that will favour sinusoidal variations of the same amplitude in the two useful components of the magnetic field for the purpose of minimising these dispersions via a variation in the angle of the magnetic field that is as linear as possible. It must therefore be stated that, in general terms, the magnetic flux measured at the surface of a multipole magnet has a trapezoidal trend, except when moving away substantially from the surface, or if use is made of a very large number of pairs of poles.

The non-generic character of the solution that stems from this therefore represents a handicap. For example, geometries with large numbers of pairs of poles or a number of pairs of poles that is smaller but is associated with a large measuring distance would rather be recommended, since this favours the sinusoidal character of the inductions read by the sensor, configurations wherein the major defect is then that of a small signal amplitude and which are therefore sensitive to external interference or have high noise levels. Other configurations tend towards this magnetic equilibrium, which gives a linear variation in the angle of the magnetic field, but all have a drawback. Thus a multipole rotor the geometry of which is characterised by a small diameter will result in a mechanical incompatibility with the diameter of the shaft of the application the position of which must be detected. Or again a ring that is very high compared with its diameter will accentuate the already excessive axial space requirement of this sensor.

Moreover, it should be noted that, if it is wished to use a printed circuit common to the two probes of the two sensors, the use of sensors of the AMR type requires the use of axial and tangential magnetic components denoted Bz and Bt, on the main magnet, since these are used by the secondary sensor. This involves an offset of the sensor from the mid-plane of the magnet so as to generate an axial component. The major drawback is that this requires positioning the probe of the main sensor at a very precise distance from the mid-plane of the magnet for the purpose of tending towards equilibrium of the axial and tangential components procuring a linear variation in the magnetic angle during the variation in the mechanical angle. This equilibrium is unstable since the ring has a small axial dimension as illustrated in the solution. Such a sensor is therefore not very robust under axial and radial clearances and the magnetic flux used by this type of configuration is weak since it is essentially based on the use of a leakage flux with regard to the axial component and requires a magnet remanence typical of a high-energy magnet in order to supply an acceptable flux. Moreover, this offset finally requires the main sensor and the secondary magnet to be closer, which accentuates the imprecision of the sensor because of the magnetic interference caused by the secondary magnet on the main sensor. If it is wished to produce the offset in the other direction of the magnet, which can be envisaged, the space requirement for the solution is further degraded.

On the assumption that it is wished to generate a magnetically more stable configuration, it is possible to imagine using the normal and tangential components generated by the main magnet. The result is then a sensor configuration that is bulky and expensive, such as the one described in the solution, namely the use of two printed circuits.

It should also be emphasised that the use of a large number of pole pairs on the main sensor as required by the solution results in an electrical frequency seen by the sensor, when the rotary shaft is rotating, which may cause significant slip between the position indicated by the electronics and the actual position or a loss of resolution because of the limitations in bandwidth of the processing circuits used. Moreover, the greater the number of poles, the more difficult it will be to obtain a precise absolute position on this type of multi-turn sensor.

This is because, in the case of a 30-pole sensor, as described in the patent application EP 1 830 155, a magnet is obtained with an angular length of 12° (360/30) on which the position given by the input sensor will be precise. However, the secondary sensor must give the position over +/−1 turn (+/−360°), which gives rise, for a sensor with a precision of +/−0.5%, an error of +/−3.6° in the input angular position. This already represents an error corresponding to 60% of the angular length. If the magnetic and mechanical hysteresis of the secondary sensor is added to this error, the risk of losing the absolute information is then very great.

If it is now wished to create a +/−2.5 turn sensor (+1-900°) then, for a secondary sensor with a precision of +/−0.5%, an error of +/−9° is generated in the input angular position. It will then be understood that the secondary sensor the intrinsic non-linearity error (or hysteresis phenomenon) of which is already 18° is therefore no longer capable of discriminating in which 12° pole the input sensor is situated. Certainly, the sensor described in the patent application EP 1 830 155 is still absolute, but this is no longer an absolute position sensor precise at the same time. If it is wished to give the secondary sensor its absolute function again, then it would have to have a precision of less than +/−0.34%, which means that a multi-pole ring with 20 poles would be required, which does not make it possible to approach a precise main sensor for the reasons mentioned above. For such a +/−2.5 turn sensor configuration the sensor described in the patent application EP 1 830 155 proposes the use of a third sensor and the relative measurement of the offset that is created between the second sensor and the third sensor, which makes the solution much more complex.

A major defect of the solution is therefore either the great precision that is required of the secondary sensor in the aforementioned example because of the necessity for the main magnet to have a large number of pairs of poles, or a small number of pairs of poles if it is wished to reduce this requirement for precision on the secondary sensor. However, it is recognised that these types of magnetic precision sensor may be subjected to appreciable external magnetic influences beginning with those coming from the multipole magnet of the input sensor. It is therefore very difficult to maintain such precision in environments typical of those of a vehicle. A person skilled in the art is then led to the second option but this does not make it possible to approach generic configurations of a main sensor that are precise unless the diameter of the ring is reduced or the detection air gap is increased, which then takes us back to the previous issues.

Finally, the use of an AMR for the turn sensor (the one giving the absolute position) also involves having an absolute output signal having a periodicity of 180°, i.e. 0.5 turns if a bipolar magnet is used. This involves a greater reduction ratio, which will have to be 8 for a travel of +/−2 turns as against 4 for a secondary sensor, which would give an absolute position over 360° of mechanical angle. The space requirement of such a motion converter will therefore be greater than if the secondary sensor were working over 1 turn.

Torque sensor solutions associated with the use of a multi-turn sensor are also known in the prior art. The patent application WO 2005/076860 presents a multi-turn absolute position and torque sensor structure with two major drawbacks. Firstly, it is bulky since it in fact consists of two distinct sensors, one being placed above the other. Secondly the absolute position of the multi-turn position sensor is achieved via a discrete motion converter that does not make it possible to maintain an absolute position of the input shaft in the event of a fault on the main sensor. In the patent application WO 2009/047401, even if the problem of the discrete measurement of the multi-turn position is solved, the association of the two sensors remains bulky since it is achieved by stacking the torque sensor function and multi-turn position sensor and, the main sensor being of the absolute type over one turn, it consists of a bipolar magnet that generates a high magnetic disturbance on the Hall sensors constituting the torque sensor also conferring a lack of precision on the whole.

The present invention sets out to solve these problems by virtue of a generic and compact precise multi-turn position sensor solution that depends on an adaptation of the number of pairs of poles of the main magnet situated at the input rotor that depends on the reduction ratio of the motion converter with which the input rotor is associated and the global position of the secondary sensor, while taking account of the capacity for integration in a torque sensor. A person skilled in the art, as the instinct for the search for precision would urge him, would, in the light of the prior document cited, always seek to further increase the number of poles of the main rotor.

The adaptation of the number of pairs of poles of the main magnet enables the sensor to keep its precise multi-turn character while relieving the precision required on the secondary sensor. First, the use on the main sensor of magnetosensitive probes of the Hall effect type with field direction detection integrating a relative gain correction between the magnetic components or of the magnetoresistive type in association with ferromagnetic concentrators confers on the sensor an intrinsic precision that requires no additional correction electronics. All these elements then confer a generic character on the sensor according to the invention. Moreover, the motion converter is connected to an absolute secondary sensor, situated on the last mechanical converter reduction stage. This motion converter as well as the two sensors are then integrated in the volume of the main rotor, conferring on the sensor a compactness as sought by the relevant applications.

The sensor according to the invention remains capable of providing a precise absolute position on ignition and is what is termed "true power on". The present invention also proposes to regulate the problems of compactness and precision of torque sensors by proposing a mechanical integration of the sensor for the relative position of two shafts that is more compact afforded firstly because of the use of a main magnet of the multi-pole type that generates a low magnetic disturbance over the whole structure because of the shorter looping back of the field lines emanating from the main magnet and secondly by virtue of the positioning of the motion converter substantially in the space occupied by the main magnet. Consequently the main magnet of the position sensor, through its multi-pole character, is concentrically integrated within the torque sensor, thus limiting, on the external space, its interaction with the collecting part of the torque sensor and in the inner volume its interaction with the teeth of the stators. It will be noted that a magnetisation of the multi-pole sinusoidal type with the main magnet advantageously further limits or even cancels out the magnetic interference caused by the magnet in its inner volume on the stator part and through the absence of magnetic flux on the internal diameter of the magnet. Nevertheless, whatever the type of magnetisation adopted for the main magnet, for the purpose of cancelling out the interaction of the main magnet on the stator part of the torque sensor, it will advantageously be possible to associate the main magnet with a ferromagnetic armature.

The present invention more particularly relates to a magnetic device for detecting the absolute position of a rotating input shaft consisting of:

a main rotor comprising a main magnet secured to said input shaft effecting a travel of n times 360°, n being greater than 1, and a driving member of a motion converter, at least one first magnetosensitive probe delivering, over a magnetic angle of 360°, a signal proportional to the direction of the magnetic field generated by the main magnet for the purpose of deriving a measurement of absolute position of the input shaft, a secondary magnet having two magnetic poles and effecting a travel of around 360° under the effect of the rotation of the input shaft via the motion converter, at least one second magnetosensitive probe delivering, over a magnetic angle of around 360°, a signal proportional to the direction of the magnetic field generated by the secondary magnet and able to derive therefrom a measurement of absolute position of the secondary magnetic, the secondary probe and the secondary magnet constituting a position sensor of epsilon precision, expressed as a percentage, the secondary magnet being substantially positioned within the height H defined by the upper and lower planes of the main rotor, characterised in that the main magnet is multi-pole and has P pairs of poles, where P is greater than 1.

The absolute position and multi-turn magnetic detection device proposed consists of two magnetic sensors, one of which, referred to as the main position sensor, is connected to the input rotor and supplies a precise position over a magnetic period corresponding to one rotation of the input rotor by a mechanical angle equivalent to one pair of poles of the multi-pole ring, and the other, referred to as the secondary position sensor, which confers a not necessarily precise absolute position on the sensor of the present invention, is connected to the last reduction stage of the motion converter interposed between the main sensor and the secondary sensor so that $n=\theta/\alpha$ with $\theta$ the angle of the input sensor (strictly greater than 0) and $\alpha$ the angle of the secondary sensor. Thus the association of two angle measurements linked by the equation $n=\theta/\alpha$ makes it possible to obtain a precise absolute position multi-turn sensor that requires only rudimentary electronics for defining the position via the signals generated by the two sensors but no correction or learning algorithm and storage of errors of the main and secondary sensor or sensors.

Non-restrictively in the context of the invention, the following motion convertions can be employed: those known as parallel gear train or gear and worm and finally multi-pole wheel magnetic coupling. The movement conversion ideally takes place in a part of the space substantially lying in the part containing the main magnet. Thus the first reduction stage may be adjacent to the magnet or even concentrically integrated in the magnet for the purpose of reducing the axial space requirement. The reduction stage may be moulded alongside the magnet or on the magnet. In the context of a contactless motion converter, the main magnet may advantageously constitute the first reduction stage of the converter.

The secondary magnet of the position sensor will preferentially be magnetised in a bipolar fashion. It may deliver continuous absolute position information from 0° to 360° of angle of rotation of the axis of the secondary sensor. The useful travel of the sensor will ideally be around 360° corresponding substantially to an angle of rotation of 360×n of the input rotor, "n" being able to be non-integer but greater than 0. Nothing prevents the application of the present invention to an angle $\alpha$ of less than 360° with as a consequence a greater reduction ratio between the input shaft and the output shaft. The magnet of the secondary sensor may be a cylinder magnetised diametrically or along two magnetised poles along the thickness of the cylinder or a parallelepiped magnetised along either its width or its length, associated with the probe situated on the axis of revolution of the magnet. A diametrically magnetised hollow ring can also be imagined in association with a probe positioned outside the axis of revolution of the magnet. These examples of configurations cited are not limitative of the magnetic design of an absolute position sensor over 360°. In some cases of requirement for precision or search for compactness, shielding may be integrated in the vicinity of the secondary magnet. The logical combination of the two items of position information makes it possible to derive therefrom precise and absolute position information over several turns of a mechanical axis.

The purpose of the main magnet connected to the input rotor is to give a precise measurement of angle of periodicity "T" the precision of which corresponds to the precision required by the application. It therefore delivers a fine signal. The magnet may be a ring or a disc. According to a first variant, its magnetisation will be of the multi-pole type radially through for a ring or axially through for a disc. The probe associated with the main sensor is positioned in the mid-plane of the magnet or axially offset in the case of a ring or on the mean diameter or radially offset in the case of a disc. Preferentially, it will use the tangential and radial or tangential and axial components in the case of a Hall sensor or directly the magnetic angle between the tangential and radial and tangential and axial components in the context of the use of a magnetoresistive probe coupled to field concentrators.

The probe associated with the secondary magnet also reads two of the three magnetic components for a detection of the Hall type or the magnetic angle formed by two of the three components when a magnetoresistor is used. The secondary magnet and the probe that is associated therewith constitute an angular position sensor of precision +/−epsilon ($\epsilon$), expressed as a percentage. Thus, if the precision of the secondary sensor is +/−0.5% over 360° of rotation of the secondary sensor shaft, then this means that the angular error compared with the angle of rotation of the input shaft is +/−0.5% of 360×n. Let us take the example of a sensor of approximately +/−3 turns, the secondary sensor thus defined will generate an error of +/−10.8°.

According to the invention, the main multipole magnet associated with a probe detecting a magnetic angle of 360° will have to have a minimum period T, expressed in degrees:

$$T > 2 \cdot \frac{\varepsilon}{100} \cdot 360 \cdot n$$

And the number of pairs of poles P of the main magnet is limited and defined by (E[x] designating the integer part of x):

$$P < E[50/\varepsilon \cdot n]$$

The minimum number being strictly greater than one pair of poles. In the context of a 6-turn sensor, and a precision of the secondary sensor of +/−0.5% using a measurement over a magnetic angle of 360°, ε is equal to 0.5, n is equal to 6 and the main rotor will comprise 16 pairs of poles, i.e. 32 adjacent magnetic poles at a maximum.

If the detection probe were of the AMR type as proposed by the patent application EP 1 830 155 A1, the magnetic detection angle is then 180° and is then done on a single pole. In this case the maximum number of periods T, expressed in degrees, is then written:

$$T > 4 \cdot \frac{\varepsilon}{100} \cdot 360 \cdot n$$

And the maximum number of pairs of poles of the main magnet is then:

$$P < E[25/\varepsilon \cdot n]$$

For a 4-turn sensor and a 180° probe, the main rotor consists of a maximum of 12 pairs of poles if the secondary sensor has a precision of +/−0.5%. For a 6-turn sensor, the main magnet according to the invention presented here has a maximum of 8 pairs of poles, i.e. 16 adjacent magnetic poles a maximum. It can thus be seen that, according to the invention proposed, even using a detection of the AMR type, the number of pairs of poles at the main magnet must remain low.

In some cases, the amplitude of the hysteresis of the detection device, expressed in degrees and denoted Hyst, and compared with the input shaft, of magnetic and mechanical origin, may become great because for example of appreciable friction generated by the motion converter. Thus, according to the invention, the main multipole magnet associated with a detection probe of a magnetic angle, of 360° will have to have a minimum period T, expressed in degrees:

$$T > 2 \cdot \frac{\text{epsilon}}{100} \cdot 360 \cdot n + Hyst$$

And the maximum number of pairs of poles P of the main magnet is (E[x] designating the integer part of x):

$$P < E[360/T]$$

The minimum number is strictly greater than 1 pair of poles.

According to a particular embodiment, the main magnet is inscribed within the inner volume of the driving member.

According to a particular embodiment, the P poles are radially magnetised. According to another particular embodiment, the P poles are radially magnetised. According to another particular embodiment, the P poles are gradually saturatedly magnetised.

The main magnet, whether radially, sinusoidally or gradually saturatedly magnetised, may be associated with a ferromagnetic armature on its surface corresponding to the surface opposite the probe reading surface. It may thus, where applicable, magnetically isolate the main magnet from any interaction with an additional magnetosensitive device. However, the specificity of sinusoidal magnetisation making it possible to concentrate the magnetic flux on the external (or internal) periphery of the magnet, may advantageously make it possible not to use such an armature.

A sinusoidal multipole magnetisation or a radial multipole magnetisation, gradual in saturation field, makes it possible to have a substantially sinusoidal magnetic flux on the surface of the magnet whatever the air gap and the number of pairs of poles, unlike a conventional alternating multipole magnetisation of the radial type. All the teachings concerning the implementation and use of such a magnetisation mode are found in the patent EP 1989505. Gradually saturated through magnetisation is characterised by a magnetisation vector the direction of which is radial for a ring or axial for a disc, with a direction alternately oriented towards the axis of the ring or towards the outside for a ring and from the lower surface towards the external surface or from the external surface to the lower surface for a disc, according to the polarity of the poles, and the amplitude of which varies substantially linearly from 100% of the saturation to 0%.

According to a particular embodiment, the magnetic position detection device is associated with electronics which, by means of the signals from the two magnetosensitive probes, makes it possible to logically derive a precise absolute position of the input shaft. According to a particular embodiment, the second probe and the secondary magnet comprise shielding in the form of a ferromagnetic pieces positioned in the vicinity of the secondary magnet. According to a particular embodiment, the magnetosensitive probes, positioned in the vicinity of the magnetised surface of the magnet, are of the Hall effect type (for example from the company MELEXIS, of type MLX90333 or MLX90316 or MLX91204, or from the company MICRONAS of type HAL3625, etc.) capable of each supplying either two distinct signals B1 and B2 representing two of the three magnetic components generated by either one of the main and secondary magnets that will subsequently be used by a microcontroller, or directly an electrical signal representing the mechanical rotation angle by integrating an arc tangent calculation of the ratio of the two magnetic components read after multiplying one of them by a gain.

Starting from the two magnetic field components (tangential to the magnet and normal or axial to the magnet according to the orientation of the probe), the real magnetic angle is calculated by the arc tangent of the two considered components. When the amplitudes of the two components are not equal, the angle of the magnetic field thus measured by this calculation differs from the so-called "electrical" rotation angle and equal to the mechanical rotational angle divided by the number of pairs of poles P.

According to a particular embodiment, said probes are able to calculate the electrical angle β after multiplication of one of the two signals B1 and B2 by a gain G such that:

$$\beta = \text{Arctan}\left(\frac{G \cdot B1}{B2}\right)$$

According to a particular embodiment, the magnetosensitive probes are of the magnetoresistive type.

In the case of magnetoresistive probes they can advantageously be associated with ferromagnetic concentrators the function of which is to make linear the variation in magnetic angle seen by the probe. This type of probe and concentrator assembly is already described in the applicant's patent application WO 2010/046550 A1. The use of these ferromagnetic pieces can also be envisaged with probes of the Hall type for the same purpose of equalisation of the amplitudes of the two magnetic components used.

According to a particular embodiment, at least one of the magnetosensitive probes is associated with a flux concentrator. According to a particular embodiment, the main magnet is associated with at least two magnetosensitive probes.

It is possible in fact to imagine doubling the probes close to either one or both magnets for the purpose either of producing a redundant sensor or increasing the precision of the sensor or lowering its sensitivity to external fields. The increase in precision or the better robustness to interfering fields may in fact be obtained via the two probes associated with each sensor when they are advantageously positioned at 90° electrical from each other. Each of the two magnetic components will then be obtained by an algebraic composition of two magnetic components each issuing from one of the two probes. An example of composition and use of such a configuration is given in the patent application WO 2009/101270. According to a particular embodiment, when the probes close to a magnet are doubled, these two magnetosensitive probes are angularly offset by an angle equal to i.360/P+90/P degrees where P is the number of pairs of poles and i is a natural integer that may be zero.

In another embodiment the magnetic absolute position detection device according to the invention comprises a device for detecting the relative rotation between two so-called "torque sensor" shafts such as those usually found on the electrical assisted steering of a vehicle. This torque sensor thus formed may be of the type claimed in the applicant's patents or patent application EP 1269133 and EP 1774272. The torque sensor consists of a stator structure connected to one of the two shafts of the steering column. A magnet is associated with the other shaft. The relative rotation angle between the two shafts is typically equal to +/−0.5° to +/−10°. A third magnetic part fixed with respect to the other two entities in rotation collects and concentrates a magnetic flux emanating from the stator part and is responsible for measuring the variation in relative angle between the two shafts by means of at least one Hall effect probe. The two shafts may have together an angular movement with respect to the flux collection and concentration structure. The rotation of the two shafts may take place over several turns but more typically from approximately 0.5 turns to approximately 4 turns.

The invention particularly relates to a magnetic absolute position detection device in particular intended for detecting the torsion of a steering column, comprising:

at least one device for detecting the relative angular position of coaxial input and output shafts connected by a torsion bar in order to derive therefrom the torsion torque exerted on the bar, consisting of a first magnetic rotor structure comprising a plurality of magnets, a second stator structure in the vicinity of which is placed at least one magnetosensitive probe, the main magnet being substantially concentric with the stator structure, characterised in that said magnetosensitive probe of the device for detecting relative angular position and the first and second probes are substantially positioned within the height defined by the upper and lower planes of the main rotor.

According to a particular embodiment, the stator structure consists of at least one ferromagnetic part and a plastic support. According to a particular embodiment, the ferromagnetic part, the multipole main magnet of the position sensor and the motion converter driving member are integrated in the plastic support. According to a particular embodiment, a ferromagnetic ring is interposed between the multipole main magnet and the stator structure of the torque sensor. According to a particular embodiment, the member driving the motion converter and the plastic support are the same piece. According to a particular embodiment, the plastic support is moulded onto the multipole main magnet.

According to a particular embodiment, the number P' of pairs of magnetic poles of the plurality magnets of the torque sensor is equal to k times the number P of pairs of magnetic poles of the main magnet, k being an integer. According to a particular embodiment, the number P of pairs of magnetic poles of the main magnet is equal to k times the number P' of pairs of magnetic poles of the plurality of the magnets, k being an integer and non-zero. This is because, if P and P' are linked by a proportionality coefficient, this ensures a minimal influence of the torque sensor on the position sensor and vice versa.

The possible mechanical constructions of the sensor are of the through axis type but nothing prevents the application of the principle in a so-called shaft end configuration. Moreover, even if the embodiments shown up to now all represent rotary sensors, it can be envisaged applying this invention to the case of linear position sensors with long travels (typically a few tens of millimeters). In this case, a linear movement shaft meshes via a motion converter on the main rotor of the sensor according to the invention, thus transforming the long linear travel into a multi-turn angular travel. Likewise, it can be imagined associating a shaft in linear movement associated with a flat magnet of the rectangular or bar type having a multipole magnetisation that meshes via a motion converter of the linear-rotary or linear-linear type on a magnet delivering absolute information on a reduced-magnitude travel with a ratio corresponding to the reduction ratio of the motion converter.

BRIEF DESCRIPTION OF THE DRAWINGS

The invention will be better understood with the support of the following figures.

DETAILED DESCRIPTION

Figure 1:
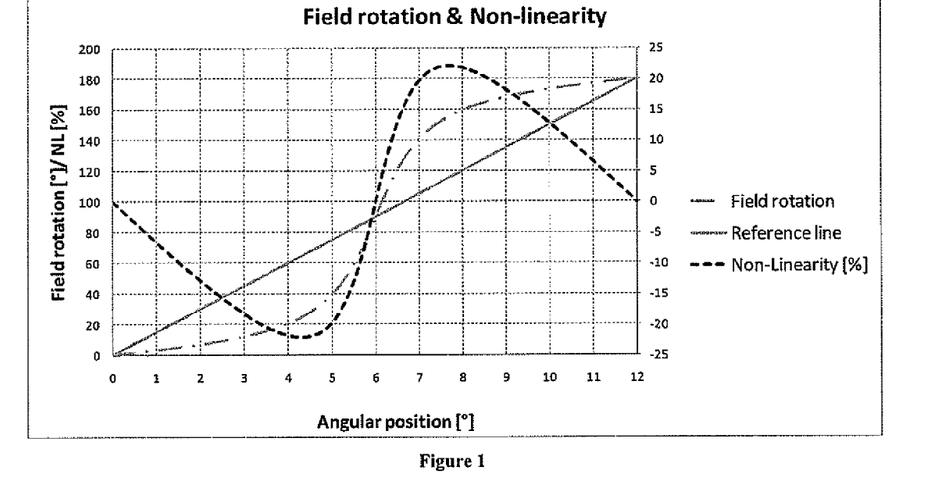
FIG. 1: discloses the change in a magnetic angle according to the mechanical angle for a non-adapted configuration of the positioning of the magnetosensitive probe according to the prior art.

FIG. 1 presents the non-linearity and field rotation results obtained with a sensor according to the document of the prior art EP 1 830 155, starting on the example of a ring with 30 poles, 5 mm high, with an outside diameter of 40 mm and an inside diameter of 36 mm (with yoke). This example particularly shows the defects of the prior art. For an axial offset of 1 mm, the ratio of the tangential components that are used for calculating the angular position is then Bt/Bz=5 at a measurement distance of 2 mm. The grey curve, in a broken dot and dash line, shows the change in the magnetic angle seen by the magnetosensitive probe associated with the main rotor and in broken black line the high position error of approximately 22% over the 12° of travel, i.e. approximately 2.6° resulting from the use of such a magnet configuration without prior search for the optimum axial position of the probe with respect to the mid-plane situated halfway up the magnet.

Figure 2:
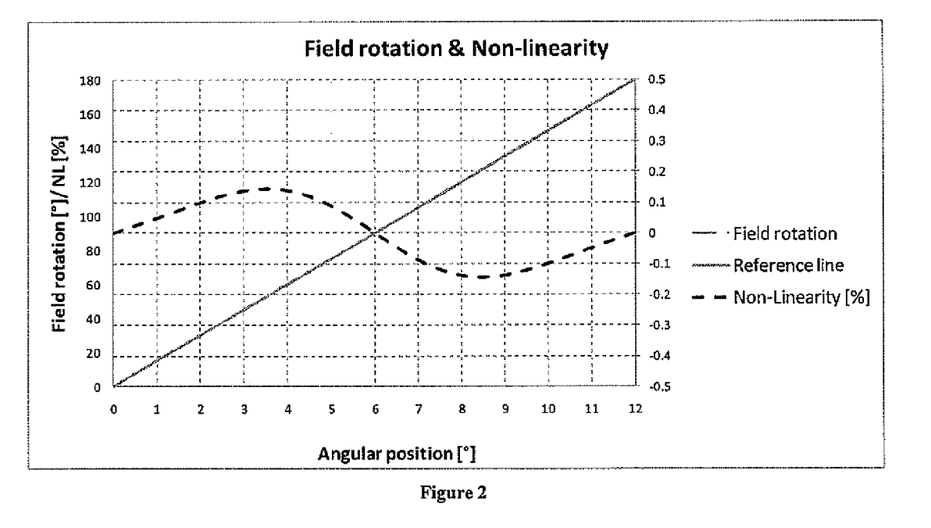
FIG. 2: discloses the change in a magnetic angle according to the mechanical angle for an adapted configuration of the positioning of the magnetosensitive probe according to the prior art.

FIG. 2 presents the results obtained, on the same sensor, with a 4 mm axial offset of the main probe with respect to the axis of the ring. The ratio of the tangential (Bt) and axial (Bz) components then becomes Bt/Bz=1.09 at a measurement distance of 2 mm, which causes a much more acceptable position error of approximately 0.14% of the 12° of travel, i.e. 0.017°. This specific axial position is optimum but not very robust and, since the work is done on a leakage flux for the axial component, involves, in order to have an acceptable working flux of 250G seen by the probe, a magnet remanence of 1T for the ring and therefore an NdFeB or SmCo magnet of the sintered type with the drawback of cost that this represents. Moreover, the necessary axial offset quickly becomes problematic for reasons either of space requirement or sensitivity to the magnetic disturbances caused by the secondary magnet if it is wished to maintain the compactness of the sensor.

Figure 3:
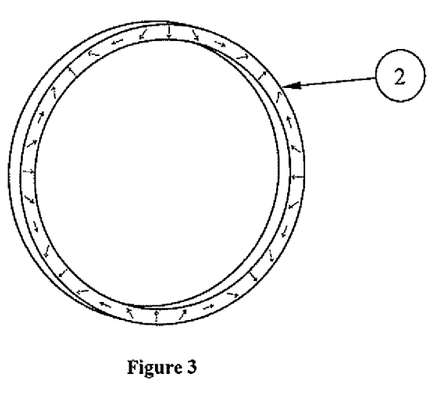
FIG. 3: preferred embodiment of the main magnet according to a sinusoidal magnetisation.

FIG. 3 presents a preferred embodiment of the main magnet 2 according to a so-called "sinusoidal" embodiment. In this case, the magnetisation direction is turning inside the magnet, as already described in the patent EP 1989505.

Figure 4A:
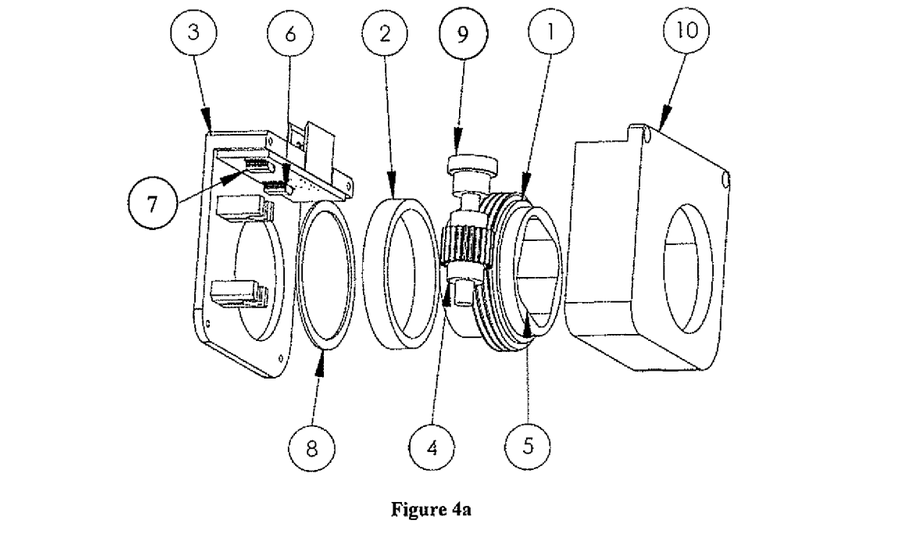
FIGS. 4a, 4b, 4c: exploded front and side views of the contactless multi-turn magnetic position sensor with through axis according to the invention according to a possible variant integrating a gear and worm converter.
Figure 4B:
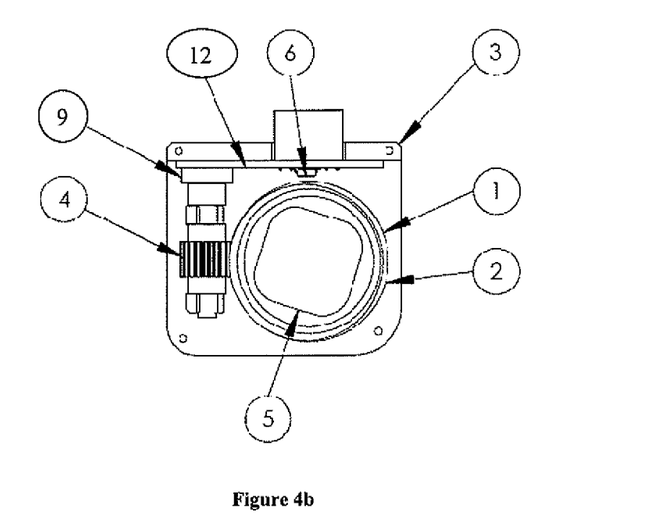
Figure 4C:
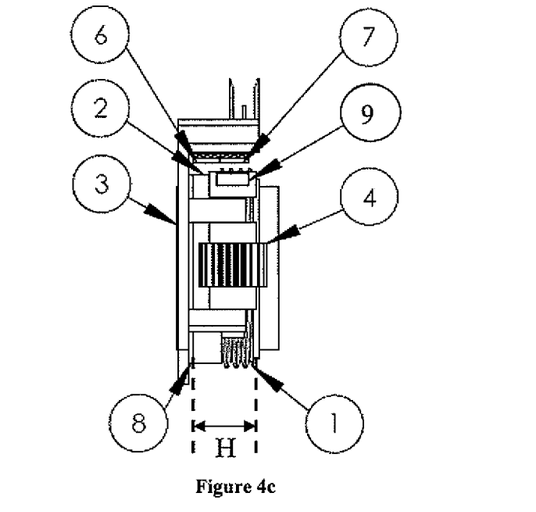

In FIGS. 4a, 4b and 4c, an example of mechanical design of the sensor according to the invention is found. Inside the housing 10 closed by the cover 3, there is the main rotor 5 connected to the input shaft wherein the motion converter composed of the driving member 1 is integrated. The multipole main magnet 2 is associated with the worm. The first magnetosensitive probe 6 reads and interprets the variations in the magnetic components and the magnetic angle generated by the main magnet when the input shaft rotates. The pinion/shaft 4 meshes on the worm and includes at its end a secondary magnet 9 the magnetic components and the magnetic angle of which vary during the rotation of said pinion/shaft and are read by the second probe 7. A spacer 8 or any other equivalent means optionally makes it possible to adjust the mechanics of the motion converter for the purpose of minimising the play in the latter. The configuration presented is not restrictive for the mechanical integrations that can be envisaged according to the invention since, as mentioned, it is possible for example to imagine a motion converter produced by means of a gear train with parallel axes. Moreover, the printed circuit 12 supporting the probes 6 and 7 may be parallel to the plane of the magnet 2 cutting the latter in two along its height. The assembly thus produced is axially compact because of a location of the secondary magnet position inside the height defined by the upper and lower planes of the main rotor 5.

FIG. 4c particularly makes it possible to assess the compactness of the device. The height H defined by the upper and lower planes of the main rotor 5 formed by the main magnet 2 and the driving member 10.

Figure 5:
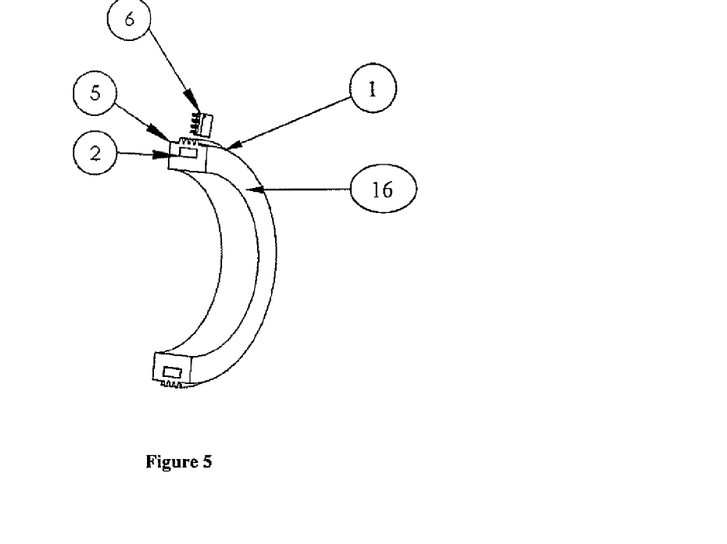
FIG. 5: isometric representation of one of the variant embodiments of the assembly consisting of the main magnet of the driving member of the motion converter and the associated measurement probe, and of the contactless multi-turn magnetic position sensor with through axis according to the invention.

FIG. 5 presents a variant embodiment of the invention and more particularly of the main rotor 5 with the driving member 1 of the motion converter, formed in, a plastic support 16 that is moulded onto the main magnet 2. In another variant, not shown, using a converter of the parallel-axis gear train type, the first stage could be a moulded-on gear wheel. It is important to emphasise that the assembly has an even more compact character by proposing, as claimed, a location of the secondary magnet 9 inside the height defined by the upper and lower planes of the main rotor 5.

Figure 6:
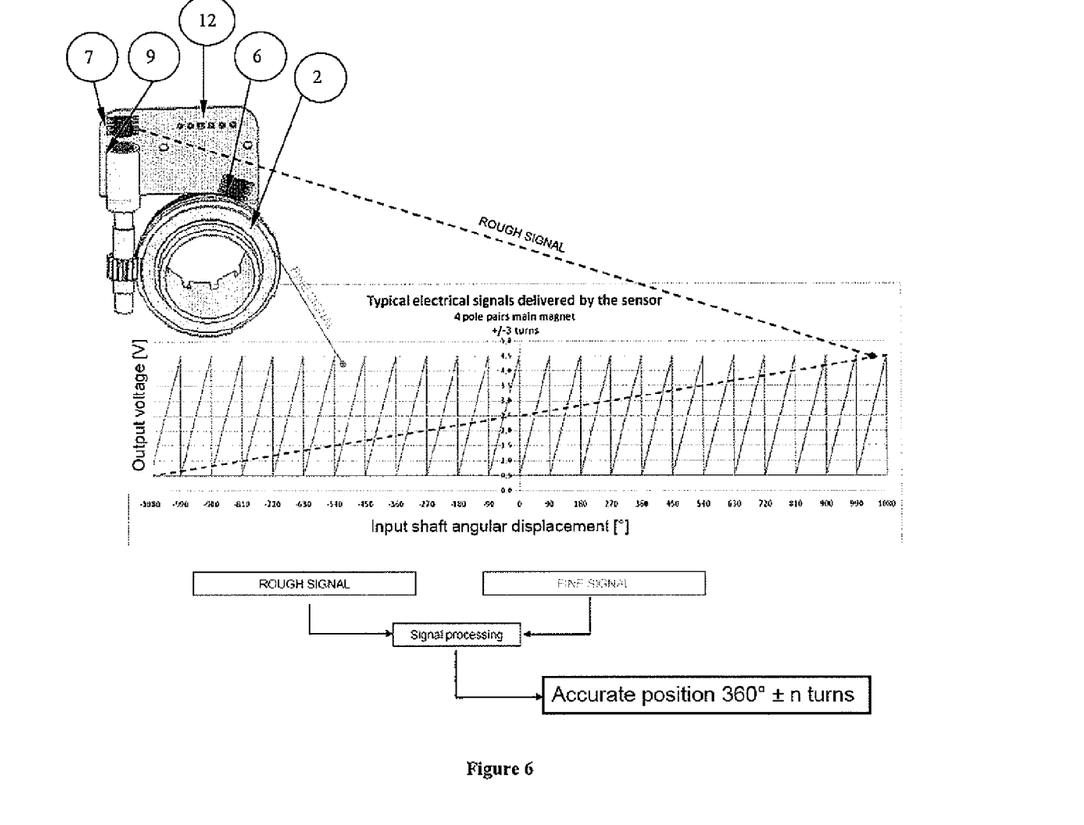
FIG. 6: outline operating diagram of the precise and absolute sensor according to a first embodiment with, its two signals emanating from each of the two probes.
Figure 7:
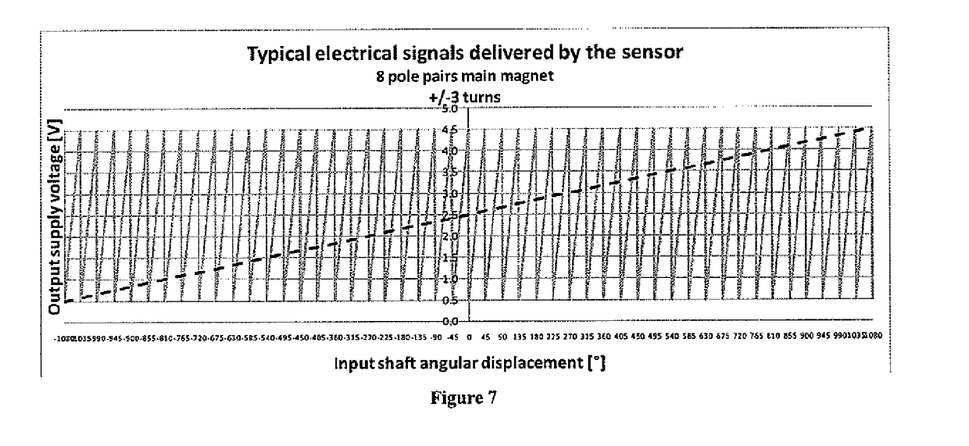
FIG. 7: outline operating diagram of the precise and absolute sensor according to a second embodiment with its two signals emanating from each of the two probes.

FIG. 6 shows the operating principle of the multi-turn sensor of the invention. The periodicity of the signal generated by the first probe 6 detecting the magnetic field generated by the main magnet 2 during its rotation over the approximately n turns is called the "fine signal" with a typical saw toothed profile. In this example, the periodicity is 90°, i.e. 8 magnetic poles of the main magnet for an example of a sensor of approximately 3 turns. The "rough signal" curve gives the absolute signal over approximately 3 turns generated by the second probe 7 generated by the secondary magnet 9 of the multi-turn absolute sensor thus formed. Each of the 2 signals is represented here via an analogue variation between 0.5V and 4.5V of the electrical signal. Variations of the PWM or SENT type can be imagined without these other examples being limitative. Likewise the number of turns or the number, of poles of the main magnet are not limited to this example. FIG. 7 illustrates in addition the results obtained with a radially magnetised 16-pole ring magnet for a sensor of approximately 3 turns.

Figure 8:
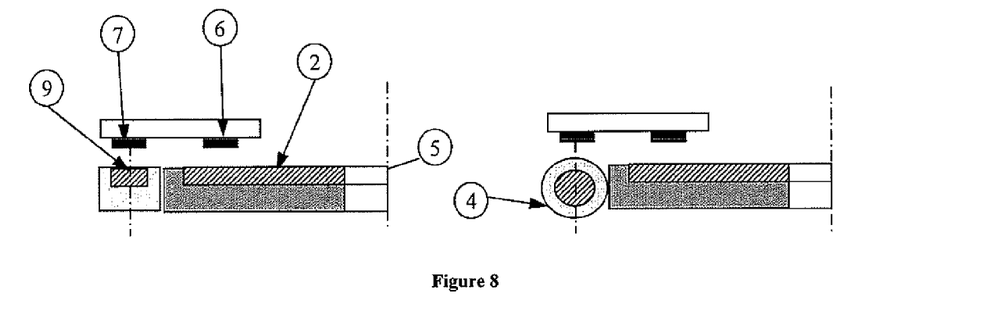
FIG. 8: schematic views of a sensor version according to the invention based on a main magnet of the disc type.

FIG. 8 illustrates a variant of the invention that consists of using a multipole disc as the main magnet 2. Without this being limitative for the invention, 2 configurations are proposed that are based in one case on the use of a converter of the gear and worm type and the other on the use of a converter with parallel gear trains. The secondary magnet 9 is positioned inside the height defined by the upper and lower planes of the main rotor 5. The embodiment is thus an axially compact construction.

Figure 9A:
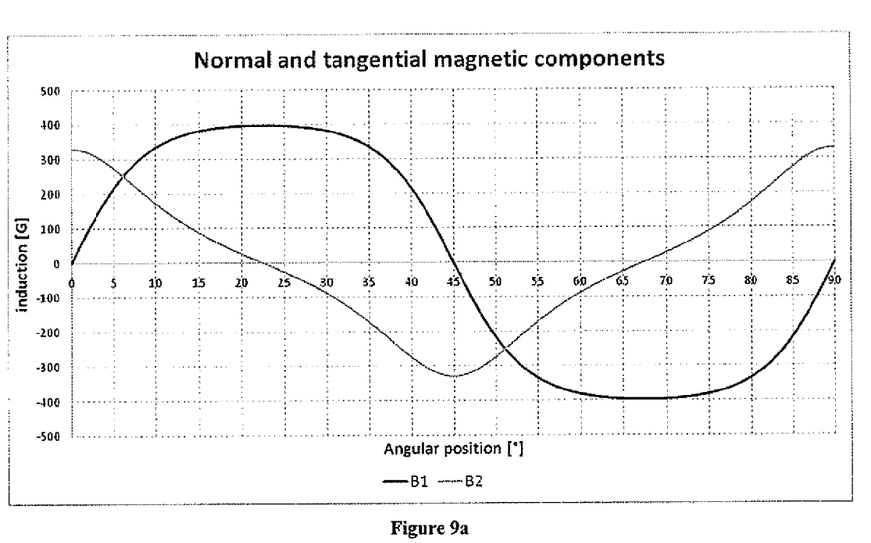
FIGS. 9a, 9b, 9c and 9d: disclosing the radial and tangential magnetic components as well as the change in the electrical angle and the non-linearity of the latter according to the mechanical angle for a radial magnetisation configuration and a sinusoidal magnetisation configuration according to the invention.
Figure 9B:
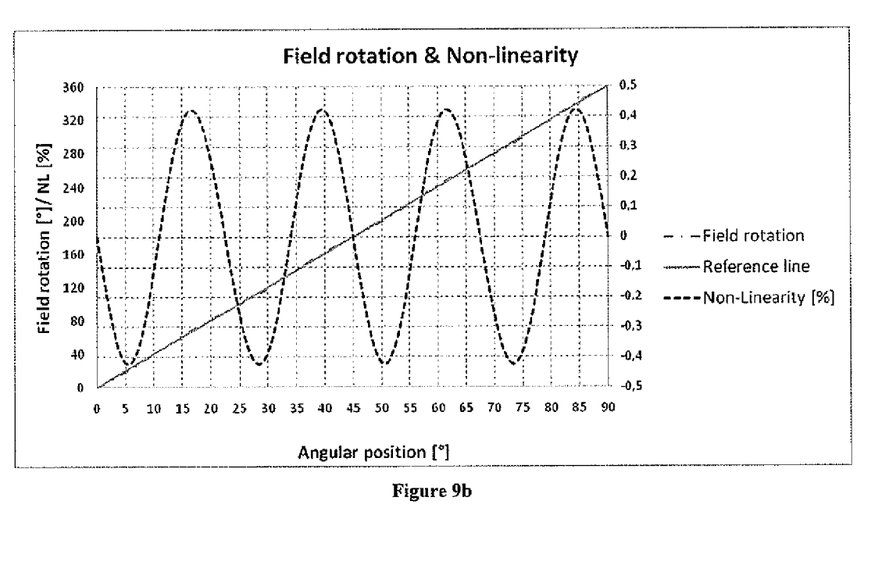

FIG. 9a presents the radial and tangential induction components obtained with the example of a ring with 8 radially magnetised poles, 5 mm high, with an outside diameter of 40 mm and an inside diameter of 36 mm (with casing). The ratio of the components is Br/Bt=1.2 at a measuring distance of 4 mm. Although the components have non-sinusoidal profiles, the use of a 0.42 gain G makes it possible to linearise the variation in the electrical angle according to the mechanical angular movement. In FIG. 9b, the grey curve, in broken dot and dash line, shows the change in the magnetic angle seen by the magnetosensitive probe 6 associated with the main rotor 5 and in broken black line the position error of approximately 0.42% over the 90° of travel, i.e. approximately 0.38° resulting from the use of such a magnet configuration.

Figure 9C:
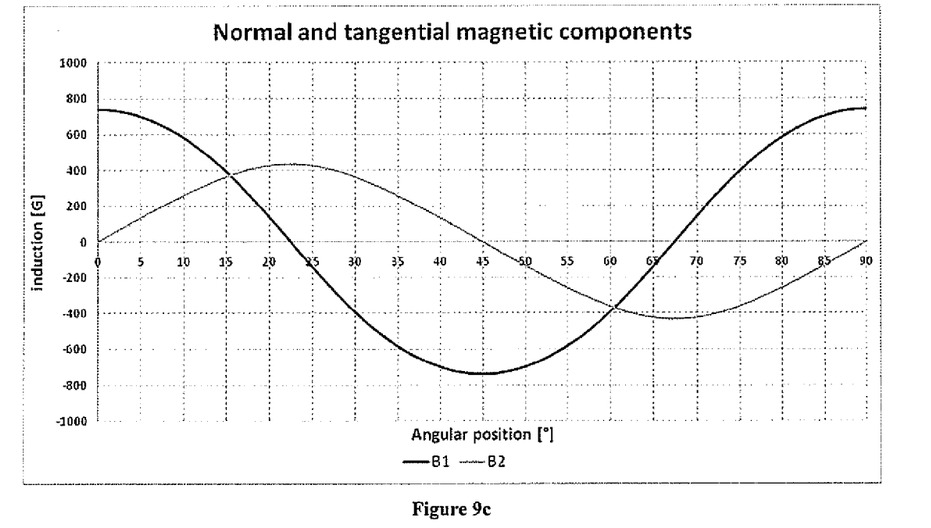

FIG. 9c shows the radial and tangential components obtained with the example of a ring with 8 sinusoidally magnetised poles, 5 mm high, with an outside diameter of 40 mm and an inside diameter of 36 mm (without casing). The ratio of the components is Br/Bt=1.7 at a measuring distance of 2 mm. Because of the sinusoidal magnetisation, the components have fully sinusoidal profiles but the difference in amplitude between the two magnetic components requires the use of a 0.53 gain G, which makes it possible to linearise the variation in the electrical angle according to the mechanical angular movement.

Figure 9D:
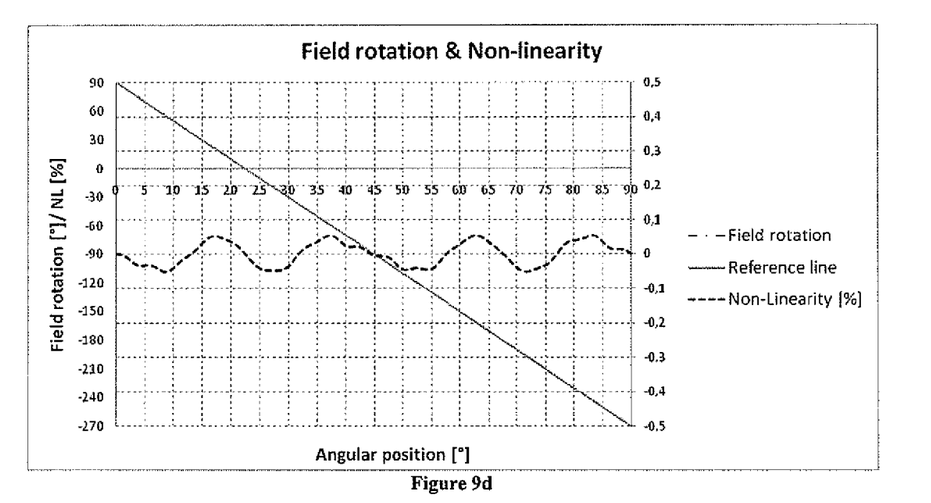

In FIG. 9d, the grey curve, in broken dot and dash line, shows the change in the magnetic angle seen by the magnetosensitive probe 6 associated with the main rotor 5 and in broken black line the position error of approximately 0.05% over the 90° of travel, i.e. approximately 0.05° resulting from the use of such a magnet and magnetisation configuration. The advantage in terms of precision of the use of a sinusoidal magnetisation is thus illustrated. It should be nevertheless stated that this favoured magnetisation mode is necessary according to the geometric configuration and the number of pairs of poles of the main magnet used and the precision constraint that the application imposes.

Figure 10:
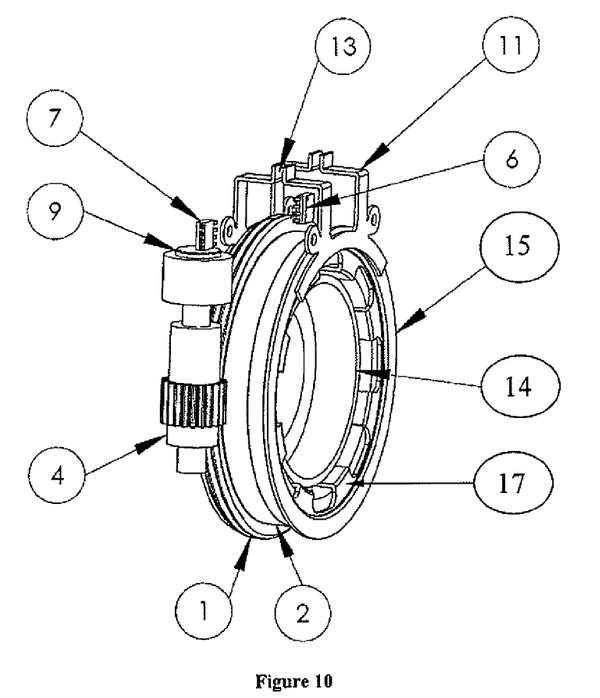
FIG. 10: Proposals for mechanical construction for a sensor for relative rotation between 2 shafts, referred to as a torque sensor, associated with a precise absolute multi-turn magnetic position sensor according to one possible configuration according to the invention.

FIG. 10 presents a first possible integration of an absolute multi-turn magnetic position sensor and a sensor for relative rotation between two shafts referred to as a "torque sensor" according to the invention. This torque sensor is formed by a stator part 15 in the form of two ferromagnetic rings 17 extended by teeth that open up axially, a multipole magnet 14 opposite the stator part 15 and a collector part 18 collecting the magnetic flux circulating in the stator part 15 and a magnetosensitive probe 13 detecting the intensity of the magnetic field thus collected by the collector part 11. On the outside of the stator part 15 there is installed, coaxially and integrally, the main magnet 2 of the multi-turn position sensor before which the first magnetosensitive probe 6 is placed fixedly. Thus, when the stator assembly, secured to the input shaft, turns about its axis of revolution, it drives the main magnet 2 and the driving member 1 installed securely against the main magnet 2. The pinion/shaft 4 meshes on the driving member 1 and rotates the secondary magnet 9 placed in front of the second magnetosensitive probe 6. The assembly produced is thus very compact, producing a "torque+position" sensor in a small height, and allows installation of the three magnetosensitive probes 6, 7 and 13 on the same printed circuit 12 (not shown in this FIG. 10).

Figure 11:
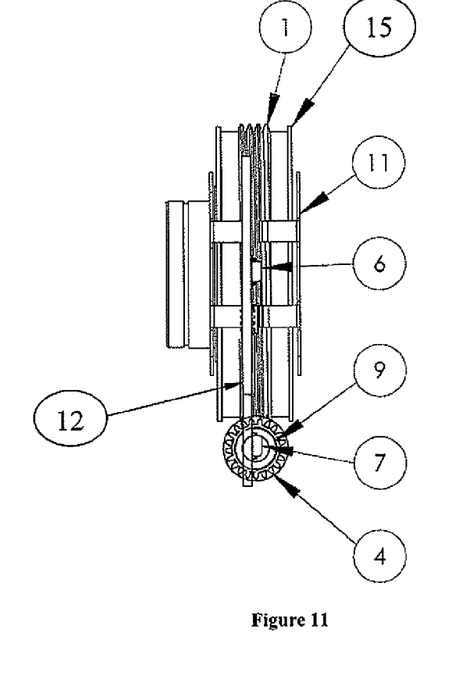
FIG. 11: Proposals for the mechanical construction for a sensor for relative rotation between 2 shafts, referred to as a torque sensor, associated with a precise absolute multi-turn magnetic position sensor according to one possible configuration according to the invention.

FIG. 11 presents a second possible integration of an absolute multi-turn magnetic position sensor and a sensor for relative rotation between 2 shafts known as a "torque sensor" according to the invention. In this configuration, the main magnet 2, not shown, is moulded on inside the driving member 1, as presented in FIG. 5. This driving member 1 is installed around the stator part 15. The first probe 6 measuring the magnetic field of the main magnet 2, the second probe 7 measuring the magnetic field of the secondary magnet 9 and the third probe 13 of the torque sensor are installed on the same printed circuit 12. This embodiment provides an even more compact design than the one shown in FIG. 10.

Figure 12:
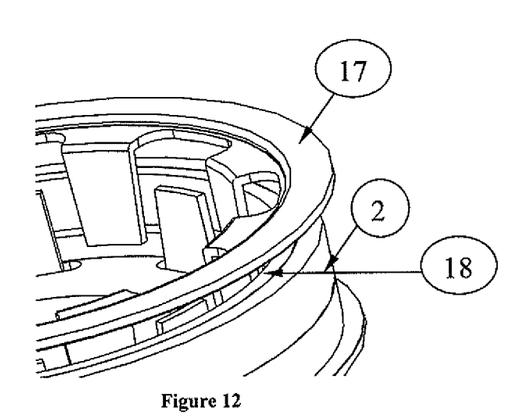
FIG. 12: isolated view of an embodiment of a sensor of relative rotation between 2 shafts, referred to as a torque sensor, associated with a precise absolute multi-turn magnetic position sensor.

FIG. 12 presents the ferromagnetic part 17 of the stator part 15 of the torque sensor. A ferromagnetic ring 18 is interposed between the main magnet 2 and the stator part 15 enabling a magnetic shielding preventing the field produced by the main magnet 2 from contaminating the torque sensor.

Figure 13:
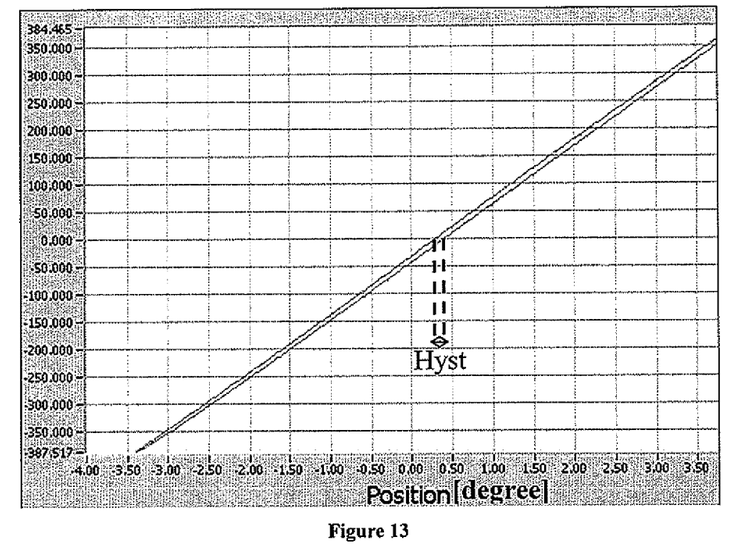
FIG. 13: illustration, on one measurement, of the concept of hysteresis.

FIG. 13 presents, on a measurement curve and in a general principle, the change in the sensor signal, retranscribed into Gauss, according to the position, in degrees, of the measured shaft. The hysteresis, denoted Hyst, is the difference, in degrees, between the signals obtained in one direction of rotation and then the other. The sizing of the minimum period of the multi-turn position sensor must take into account this hysteresis when it exists.

The invention claimed is:
1. A magnetic device for detecting the absolute position of a rotating input shaft, the device comprising:
   a main rotor comprising a main magnet secured to the input shaft effecting a travel of n times 360°, n being greater than 1, and a driving member of a motion converter;
   at least one first magnetosensitive probe delivering, over a magnetic angle of 360°, a signal proportional to a direction of a magnetic field generated by the main magnet to derive a measurement of absolute position of the input shaft;
   a secondary magnet having two magnetic poles and effecting a travel of around 360° under effect of the rotation of the input shaft via the motion converter; and
   at least one second magnetosensitive probe delivering, over a magnetic angle of around 360°, a signal proportional to the direction of a magnetic field generated by the secondary magnet and able to derive therefrom a measurement of absolute position of the secondary magnet;
   the second probe and the secondary magnet constituting a position sensor of epsilon precision, expressed as a percentage;
   the secondary magnet being substantially positioned within a height H defined by upper and lower planes of the main rotor; and
   the main magnet being multipole and having P pairs of poles, where P is greater than 1 and less than an integer part of 36/T, with

$$T > \frac{\text{epsilon}}{50} \cdot 360 \cdot n + Hyst,$$

where T is a minimum period, expressed in degrees, of the main magnet, and Hyst is an amplitude of a hysteresis of the detection device, expressed in degrees and referred to the input shaft.

2. A magnetic device for detecting the absolute position according to claim 1, wherein the main magnet inscribes in an inner volume of the driving member.

3. A magnetic device for detecting the absolute position according to claim 1, wherein the P poles are sinusoidally-magnetised.

4. A magnetic device for detecting the absolute position according to claim 1, wherein the P poles are radially magnetised.

5. A magnetic device for detecting the absolute position according to claim 1, wherein the P poles are gradually saturatedly magnetised.

6. A magnetic device for detecting the absolute position according to claim 1, further comprising electronics which, by signals from the two magnetosensitive probes, makes it possible to logically derive an absolute position of the input shaft.

7. A magnetic device for detecting the absolute position according to claim 1, wherein the main magnet is associated with at least two magnetosensitive probes.

8. A magnetic device for detecting the absolute position according to claim 7, wherein the two magnetosensitive probes are offset angularly by an angle equal to i.360/P+90/P degrees where i is a natural integer that may be zero.

9. A magnetic device for detecting the absolute position according to claim 1, wherein the first and second magnetosensitive probes are of the Hall effect type each being capable of reading two distinct signals representing 2 of the 3 magnetic components generated by either one of the main and secondary magnets.

10. A magnetic device for detecting the absolute position according to claim 1, wherein the probes calculate an electrical angle 13 after multiplying one of 2 signals B1 and B2 by a gain G such that $$b = \text{Arctan}\left(\frac{G \cdot B1}{B2}\right).$$

11. A magnetic device for detecting the absolute position according to claim 1, wherein at least one of the magnetosensitive probes is of the magnetoresistive type.

12. A magnetic device for detecting the absolute position according to claim 1, wherein at least one of the magnetosensitive probes is associated with a flux concentrator.

13. A system comprising at least one magnetic device detecting an absolute position and a steering column, the at least one magnetic device detecting the torsion of the steering column, the at least one magnetic device operably detecting the relative angular position of coaxial input and output shafts connected by a torsion bar in order to derive therefrom the torsion torque exerted on the bar, the at least one magnetic device comprising:
 a first rotor magnetic structure comprising a plurality of magnets, and a second stator structure in the vicinity of which at least one magnetosensitive probe is placed;
 a main rotor comprising a main magnet secured to the input shaft effecting a travel greater than 360°, and a driving member of a motion converter;
 at least a first magnetosensitive probe delivering, over a magnetic angle of 360°, a signal proportional to a direction of a magnetic field generated by the main magnet and deriving therefrom a measurement of absolute position of the input shaft;
 a secondary magnet having two magnetic poles and effecting a travel of around 360° under effect of the rotation of the input shaft via the motion converter; and
 at least a second magnetosensitive probe delivering, over a magnetic angle of around 360°, a signal proportional to the direction of a magnetic field generated by the secondary magnet and deriving therefrom a measurement of absolute position of the secondary magnet;
 the second probe and the secondary magnet constituting a position sensor;
 the secondary magnet being substantially positioned within a height defined by upper and lower planes of the main rotor; and
 the main magnet having multiple pairs of poles, wherein the number of pairs of poles of the main magnet is limited based on the precision of the position sensor;
 the main magnet being substantially concentric with the stator structure;
 at least one of the magnetosensitive probes of the relative angular position detection device and the first and second probes being substantially positioned within the height defined by the upper and lower planes of the main rotor.

14. A magnetic device for detecting the absolute position according to claim 13, further comprising a ferromagnetic ring interposed between the multipole main magnet of the position sensor and the second stator structure of the device for detecting the relative angular position.

15. A magnetic device for detecting the absolute position according to claim 13, wherein the second stator structure of the device for detecting the relative angular position includes a plastic support and a ferromagnetic part, the multipole main magnet and the driving member of the motion converter being integrated in the plastic support.

16. A magnetic device for detecting the absolute position according to claim 15, wherein the driving member of the motion converter and a plastic support are the same piece.

17. A magnetic device for detecting the absolute position according to claim 16, wherein the plastic support is moulded onto the multipole main magnet.

18. A magnetic device for detecting the absolute position according to claim 13, wherein a number P' of pairs of magnetic poles in the plurality of magnets is equal to k times a number P of pairs of magnetic poles of the main magnet, k being an integer.

19. A magnetic device for detecting the absolute position according to claim 13, wherein a number P of pairs of magnetic poles of the main magnet is equal to k times the number P' of pairs of magnetic poles in the plurality of magnets, k being an integer.

20. A magnetic device for detecting the absolute position of a rotating input shaft, the device comprising:
 a main magnet configured to be secured to the input shaft and having P pairs of poles;
 a first magnetosensitive probe delivering a signal proportional to a direction of a magnetic field generated by the main magnet for deriving a measurement of the position of the input shaft;
 a secondary magnet having two magnetic poles;
 a second magnetosensitive probe delivering a signal proportional to the direction of a magnetic field generated by the secondary magnet for deriving a measurement of the position of the secondary magnet, where P is greater than 1 and is limited based on the precision of a position sensor including the secondary magnet and the second magnetosensitive probe; and
 a motion converter including a driving member and a driven member, the driving member being secured to at least one of the input shaft and the main magnet for rotation therewith, the driven member being secured to the secondary magnet and driven by the driving member such that rotation of the input shaft causes rotation of the secondary magnet.

21. A magnetic device for detecting the absolute position according to claim 20, wherein the driving member includes a worm gear and the driven member includes a pinion gear.

* * * * *